Oct. 10, 1939.  L. G. EHMANN  2,175,504
CONNECTING LINK
Filed June 28, 1938  2 Sheets-Sheet 1
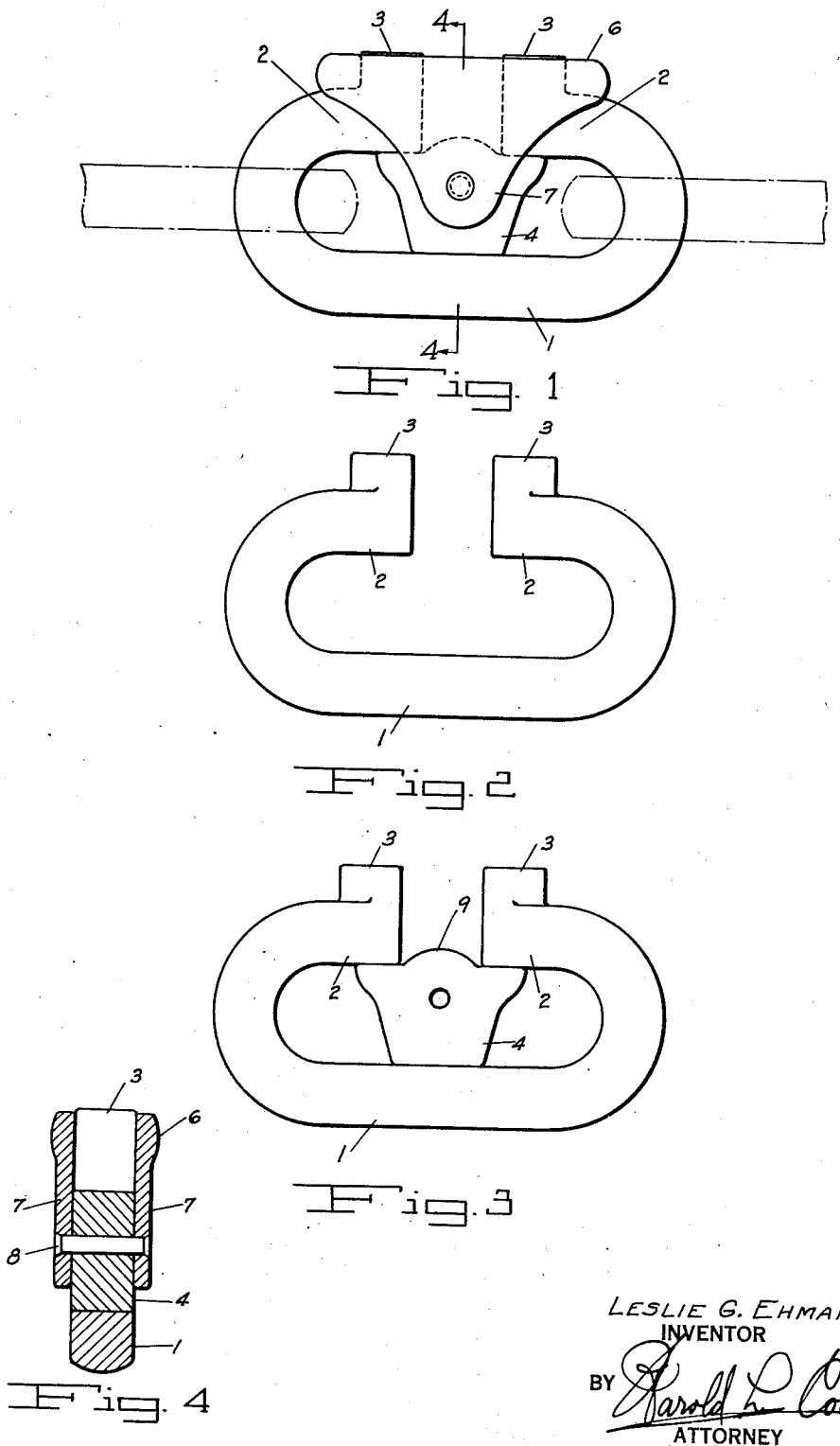

Oct. 10, 1939.  L. G. EHMANN  2,175,504
CONNECTING LINK
Filed June 28, 1938  2 Sheets-Sheet 2
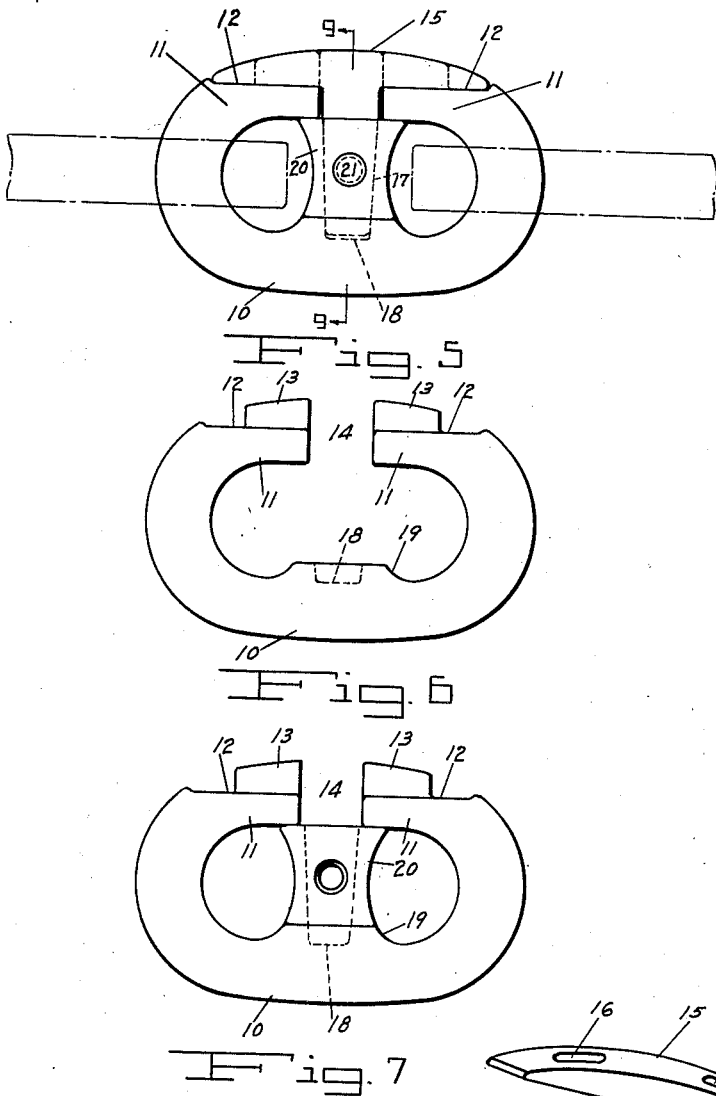
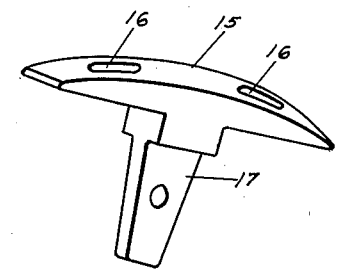
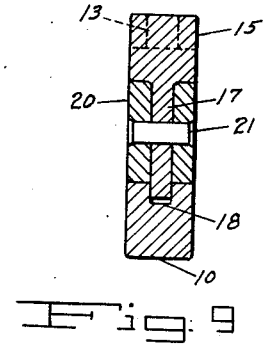
LESLIE G. EHMANN
INVENTOR
ATTORNEY Patented Oct. 10, 1939

2,175,504

UNITED STATES PATENT OFFICE 2,175,504

CONNECTING LINK

Leslie G. Ehmann, Portland, Oreg., assignor to Electric Steel Foundry, Portland, Oreg., a corporation of Oregon Application June 28, 1938, Serial No. 216,273

6 Claims. (Cl. 59—85)

This invention relates to connecting links for chains and the like, and has particular reference to a novel form of mechanism for closing and supporting the link.

Primarily, the invention relates to connecting links of cast alloy steel for use in heavy duty chains such as are used in logging operations and the like, and which are subjected to severe tractional stresses. Such links heretofore in use have been made with webbed closure members, the web being inserted through a slot in the link and secured by a pin or rivet inserted transversely through the web and through the adjacent walls of the link. To form the slots and keyways in the link, suitable cores are formed in the mold. When molten metal is poured into the mold, the presence of such cores restricts the flow of the metal, and the metal becomes prematurely cooled in flowing around the cores and causes inherent weaknesses which later may show up at any point in the link to which the metal has flowed around these cores.

Applicant has overcome these difficulties by providing a construction wherein no slots or keyways are present in the link, so that no provision need be made therefor in the mold to interfere with an even flow of metal from the risers to all portions of the casting. The resulting link is stronger and more durable than links made with slots and keyways therethrough.

It is, therefore, an object of the invention to provide a connecting link for a chain and the like, the tensil strength of which is approximately the equivalent of the tensil strength of a solid link in the chain to be repaired.

A further object of the invention is to provide a connecting link having means to prevent distortion of the link when subjected to severe tractional stresses.

A further object of the invention is to provide a connecting link for a chain and the like which may easily be inserted in a chain as a replacement part, and which is so constructed as to lengthen materially the useful life of the link.

It is a further object of the invention to provide a new and improved mechanism for closing and supporting a connecting link for chains and the like.

With these and other objects and advantages in mind, the invention resides in the novel construction and combination of parts hereinafter described, illustrated in the accompanying drawings and set forth in the appended claims; it being understood that various changes in form, proportion, size and details of construction, within the scope of the claims, may be resorted to without departing from the spirit or sacrificing any of the advantages of the invention.

In the drawings:

Figure 1 is a side elevation of a connecting link embodying the principle of the present invention.

Figure 2 is a side elevation of the link with the closure member and supporting block removed therefrom.

Figure 3 is a side elevation of the link showing the supporting block in position.

Figure 4 is a sectional elevation taken on the line 4—4 of Figure 1.

Figure 5 is a side elevation of a modified form of connecting link employing a modification of the invention.

Figure 6 is a side elevation of the link illustrated in Figure 5 with the closure member and supporting block removed therefrom.

Figure 7 is a side elevation of the link showing the supporting block in position.

Figure 8 is a perspective elevation of the closure member for the link shown in Figures 5 to 7.

Figure 9 is a sectional elevation taken on the line 9—9 of Figure 5.

One form of applicant's invention is embodied in a link having a closed side 1 and an open side comprising arms 2—2 which terminate in opposed outwardly projecting parallel lugs 3—3, these being spaced apart sufficiently to admit a standard link therebetween. Disposed intermediate between the sides of the link, so as to engage under both of the arms 2—2 and bear against the closed side of the link, is a supporting block 4. This supporting block serves a two-fold purpose, one of which is to support the open side of the link and prevent distortion of the arms and consequent rupture of the link when the link is subjected to severe tractional stresses. As explanatory of this particular function of the supporting block 4, it may be said that in the absence of such supporting means, when tractional stresses are imposed upon the link the arms 2—2 tend to bend inwardly and around the ends of the adjacent connecting links, which causes the connecting link to rupture at the juncture of the curve of the end of the link with the closed side. The supporting block maintains the shape of the link and prevents rupture of the link due to bending of the arms 2.

In addition to the above described function of the supporting block 4, the block also serves as a key member to retain the closure member in engagement with the lugs 3—3. The closure member consists of a yoke 6 designed to embrace the lugs 3—3 and hold them in their respective or relative positions, the yoke having inwardly extending spaced flanges 7—7 which embrace the supporting block 4. A pin or rivet 8 extends through the flanges 7—7 and through the block 4 to lock the respective parts in working position. While all of the parts are removable from the link, each serves to hold the other in place and prevent accidental displacement thereof. For example, the flanges 7—7 of the closure member serve to prevent the supporting block 4 from being dislodged from between the sides of the link, and the supporting block performs the function of a key to retain the yoke in engagement with the lugs 3—3. The pin 8 holds the parts in interlocked relation. A projection 9 on the supporting block extends into the opening between the lugs 3—3 and prevents the block from moving longitudinally of the link.

The connecting link illustrated in Figures 5 to 9, inclusive, comprises a link having a closed side 10 and an open side comprising arms 11—11, each of which is provided with a flat outer face 12 from which projects a lug 13. In the modified construction the lugs 13 do not project beyond the contour of the link, and the closure member is designed to make up the side wall of the link to provide a smooth outer contour. The lugs 13—13 are spaced apart to define an opening 14 which is sufficient to admit a standard link.

The closure member consists of a bar 15 having spaced openings 16—16 to receive the lugs 13—13, and having a web-portion 17 projecting inwardly of the link through the opening 14 and engaging a shallow recess 18 formed in a boss 19 on the closed side of the link.

Disposed intermediate between the sides of the link so as to engage under both of the arms 11—11 and bear against the closed side of the link, is a supporting block 20. This block forms a sleeve for the web-portion 17 of the closure member and is retained in position thereby. A pin or rivet 21 extends through the sleeve-block 20 and through the web-portion 17 of the closure member to lock the respective parts in working position. All of the parts are removable from the link to permit chain links to be inserted therein, though each serves to retain the other in place. The supporting block 20 performs the identical functions of the block 4, in that it prevents distortion and rupture of the link, and also serves as a key member to hold the closure member in engagement with the lugs 13—13.

By the construction herein described there is provided a connecting link made of a solid casting in which provision is made to support the link and prevent distortion thereof when subjected to severe tractional stresses, the support also forming a key for retaining the closure member in place, and being in turn held in place by the closure member.

Having now described my invention and in what manner the same may be used, what I claim as new and desire to protect by Letters Patent is:

1. A connecting link for chains and the like consisting of a link having one closed side and one open side, said open side having lugs projecting therefrom in the plane of the link and normal to the line of pull, a closure for said open side having openings therein adapted to receive said lugs, said closure having a web-portion projecting through said opening and engaging the opposite side of the link, a removable support for said link disposed intermediate between the sides of the link so as to engage under said lugs and bearing against the closed side of the link, said support forming a sleeve for the web-portion of the closure member, and means interconnecting said support and said closure member to retain the parts in interlocked relation.

2. A connecting link for chains and the like consisting of a link having one closed side and one open side, said open side having lugs projecting therefrom in the plane of the link and normal to the line of pull, a removable support for said link disposed intermediate between the sides of the link and so constructed and arranged as to engage under said lugs and bear against the closed side of the link, a closure member for closing the open side of said link, said closure member having a yoke for securing said lugs and having flanges for embracing said support, and means interconnecting said support and said closure member to retain the parts in interlocked relation.

3. A connecting link for chains and the like consisting of a link having one closed side and one open side, said open side having lugs projecting therefrom in the plane of the link and normal to the line of pull, a removable support for said link disposed intermediate between the sides of the link and so constructed and arranged as to engage under said lugs and bear against the closed side of said link, a closure member for closing the open side of said link, said closure member having flanges for embracing the support, and means interconnecting said support and said closure member through said flanges to retain the parts in interlocked relation.

4. A link for chains and the like consisting of a link having one closed side and one open side, a removable support for said link disposed intermediate between the sides of the link and so constructed and arranged as to engage under the ends of the arms of the open side of the link and bearing against the closed side of the link, a closure member for closing the open side of said link, and fastening means insertable through said support and said closure member to retain the parts in interlocked relation.

5. A link for chains and the like consisting of a link having one closed side and one open side, a closure member for closing the open side of said link and a key member insertable intermediate between the sides of the link, and a pin insertable through said closure member and said key member for holding the parts in interlocked relation.

6. A link for chains and the like, consisting of a link having one closed side and one open side, a closure member for closing the open side of the link, said closure member having a web portion projecting through said opening, a removable support for said link disposed intermediate between the sides of the link and so constructed and arranged as to engage under the ends of the arms of the open side of the link and bearing against the closed side of the link, said support forming a sleeve for the web portion of said closure member, and means insertable through said sleeve and said closure member for retaining the parts in interlocked relation.

LESLIE G. EHMANN.